INVENTOR.
ARTHUR M. KIVARI

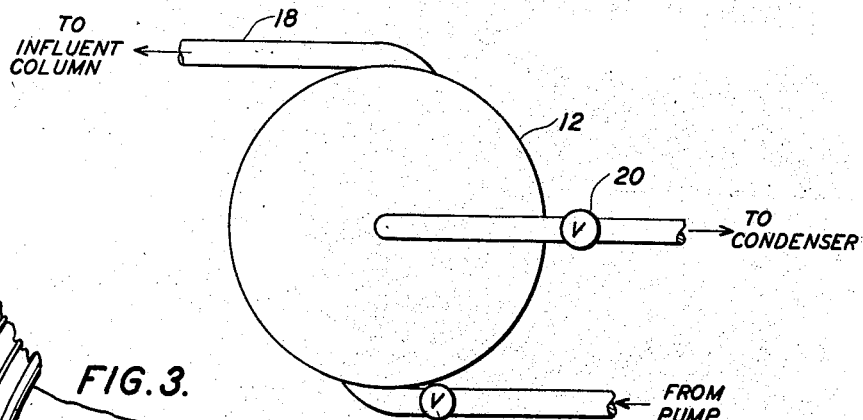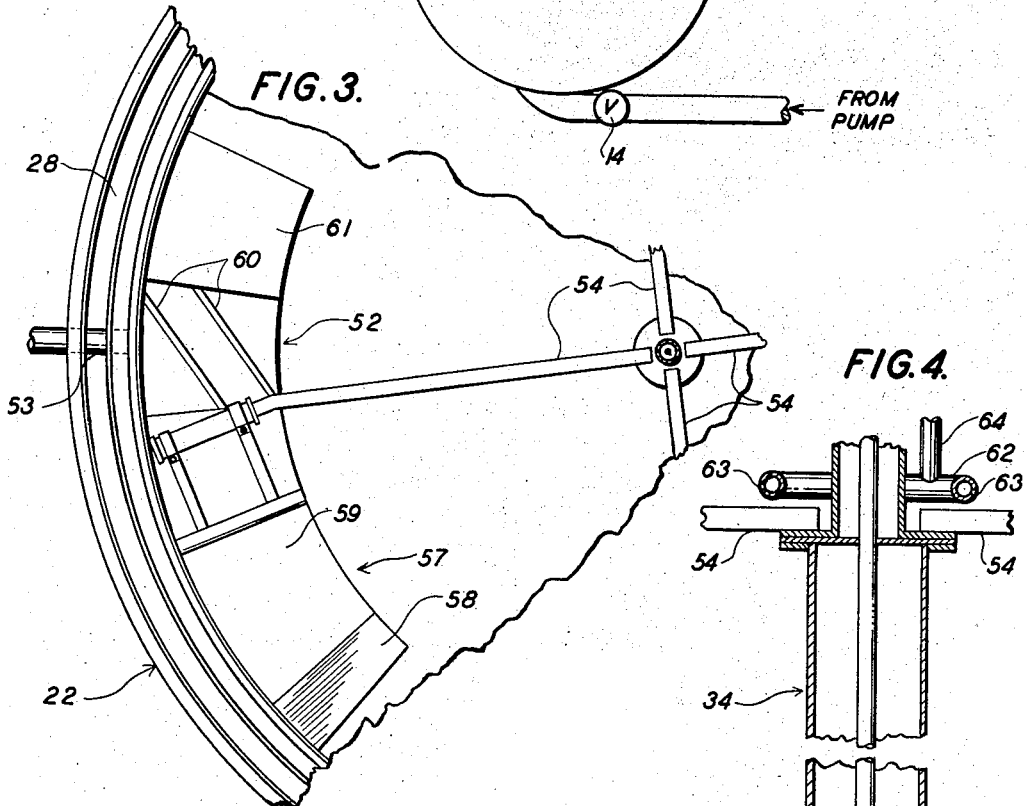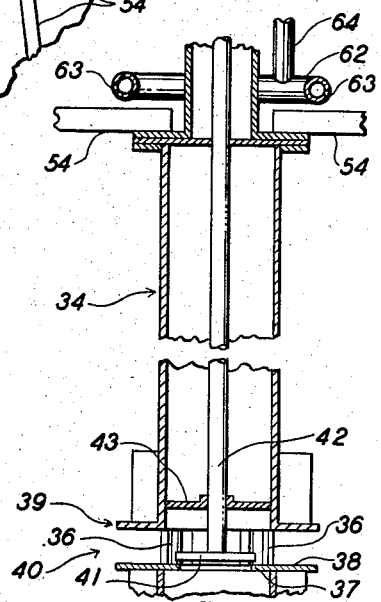

United States Patent Office 2,876,863
Patented Mar. 10, 1959

2,876,863

TREATMENT OF AQUEOUS WASTES CONTAINING HYDROCARBONS

Arthur M. Kivari, San Mateo, Calif., assignor to Process Engineers Incorporated, San Francisco, Calif., a corporation of California Application July 26, 1954, Serial No. 445,821

3 Claims. (Cl. 183—114)

This invention relates to liquid clarification and more specifically to the separation of hydrocarbons from an aqueous solution or waste.

In many industrial plant operations, for example in refineries, an aqueous waste containing a substantial amount of hydrocarbons mixed or emulsified therein is produced and must be disposed of. Due to the relatively large amount of hydrocarbon present in the waste, it cannot be discharged into conventional sewer systems. Therefore, present practice is to flow the waste containing the hydrocarbons into large pits or ponds which are open to the atmosphere. The hydrocarbons being lighter than the aqueous medium rise to the top and are eventually skimmed off the surface of the pond and thus separated from the aqueous waste. The hydrocarbons are recovered for additional use or burned for their heat value. The aqueous waste is then either returned to the plant for additional use or discharged into sewage. A serious disadvantage of the above described operation is that large surface areas of hydrocarbons are exposed to the atmosphere, and as a result, large volumes of the more volatile hydrocarbons are released to pollute the atmosphere. In addition, the hydrocarbons are often present in waste as fine bubbles or droplets which require prolonged periods to separate from the aqueous waste. This further aggravates the pollution problem since the volatile hydrocarbons are exposed to the atmosphere for long intervals of time.

Another disadvantage of present practice is that some wastes contain contaminants which are heavier than the aqueous waste and therefore settle to the bottom of the ponds rather than float. This requires periodical cleaning of the bottom of the ponds, which is expensive and interrupts the separation of the hydrocarbons from the aqueous waste.

The present invention overcomes the above disadvantages by providing a method for rapidly separating the hydrocarbons from the aqueous waste in a continuous process and without pollution of the surrounding atmosphere with the more volatile hydrocarbons.

In terms of method, the present invention contemplates separating hydrocarbons from an aqueous waste by pressurizing the waste with a gas so that the gas is dissolved in the waste. The pressure on the waste is thereafter reduced whereby some dissolved gas is freed from solution. The freed gas carries the more volatile hydrocarbons from the waste, and the evolved gas and the volatilized hydrocarbons are separated from the waste. The pressure on the waste is thereafter further reduced and the waste is held in a substantially quiescent state so that additional gas is freed from solution and aids in floating remaining liquid and solid hydrocarbons in the waste to the surface of the waste. These floating hydrocarbons are then removed from the upper part of the waste. In those aqueous wastes containing settable solids, the solids are allowed to settle to the bottom of the waste and are continuously removed therefrom.

The invention contemplates a closed tank having a liquid inlet and outlet and a vapor outlet. Means are provided for charging the waste with gas under pressure above atmospheric. Means are provided for introducing the charged waste into the liquid inlet of the closed tank, and for reducing the pressure on the charged waste within the closed tank so that some of the dissolved gas comes out of solution and carries volatile hydrocarbons with it out the vapor outlet of the closed tank. There is also provided an open tank for holding a pool of the partially degassed waste open to the atmosphere. A baffle within the open tank is spaced from the sides and bottoms thereof and projects above and below the surface of the pool to divide the tank into an inlet compartment and outlet compartment. The inlet compartment is provided with a center inlet column connected to the liquid outlet of the closed tank. Means are provided for removing floating hydrocarbons from the surface of the pool in the inner compartment and means are provided for removing waste from which the hydrocarbons have been separated from the outer compartment.

Means are provided for introducing the charged aqueous waste into the closed tank tangentially in order to cause the waste to travel as long a path as possible through the closed tank. For handling waste in which there are settable solids the open tank is provided with a sludge pit in its bottom and raking means are disposed to rake settled solids along the tank bottom into the sludge pit.

These and other aspects of the invention will be more fully understood from the following detailed description taken in conjunction with the accompanying drawings in which:

Fig. 2 is a plan view taken on line 2—2 of Fig. 1;

Fig. 3 is a partial plan view taken on line 3—3 of Fig. 1; and

Fig. 4 is an enlarged vertical section taken on line 4—4 of Fig. 1.

Figure 1:
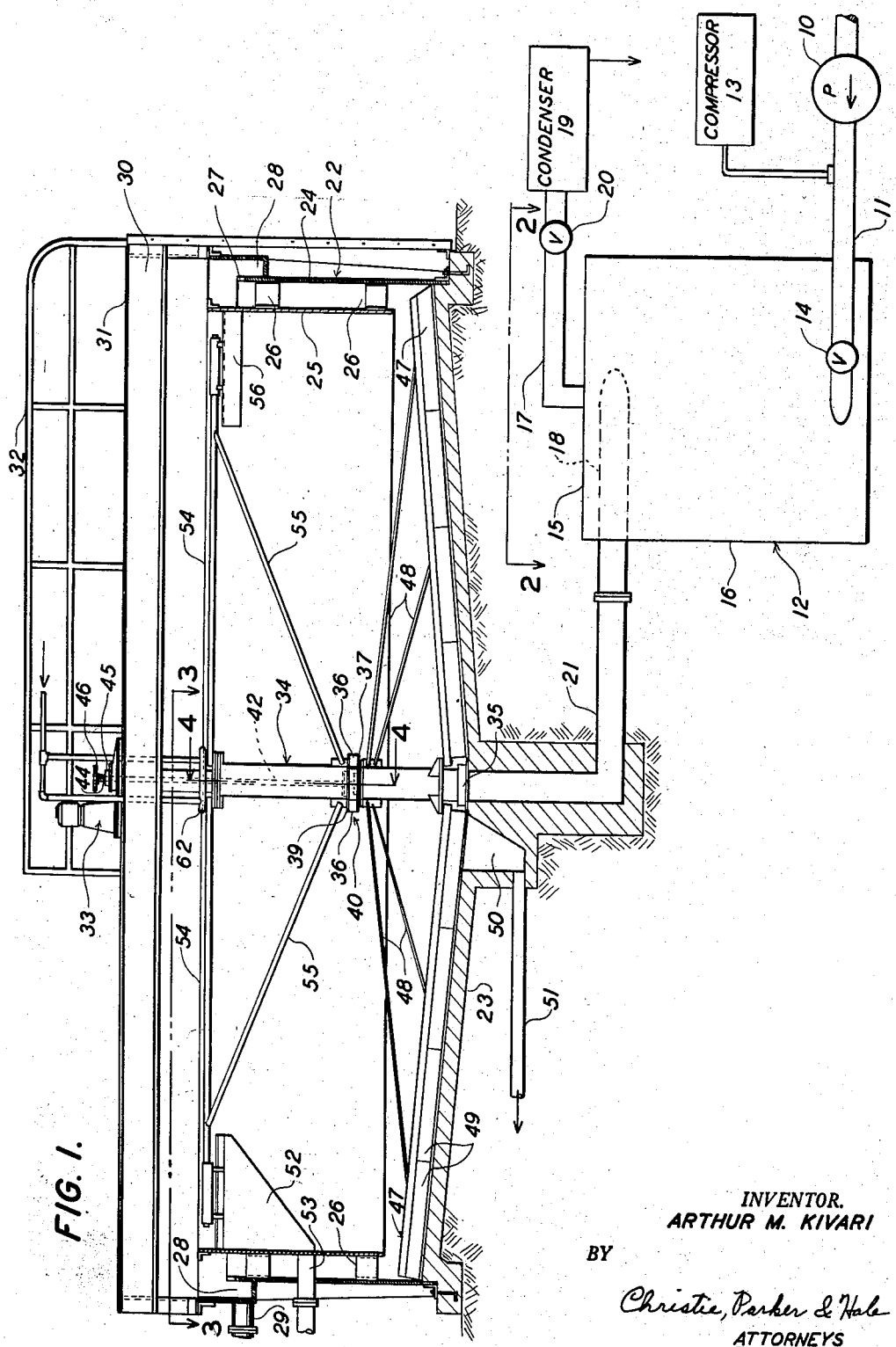
Fig. 1 is an elevation diagram, partly in vertical section, of a preferred form of the invention.

Referring to Figs. 1 and 2, a pump 10 is used to supply aqueous waste under pressure to a liquid inlet 11 of a closed tank 12. A gas, e. g., air, carbon dioxide, methane, etc., is charged into the influent waste by means of a compressor 13 which has its discharge side connected between the pump and a liquid inlet back-pressure valve 14 in the liquid inlet. The closed tank is an upright cylinder having a top 15 and a side wall 16. A vapor outlet 17 is provided in the tank top, and a liquid outlet 18 is provided in the upper portion of the upright wall. The vapor outlet is connected to a conventional condenser 19, and a vapor outlet back-pressure valve 20 is in the vapor outlet between the closed tank and the condenser. The liquid inlet discharges waste tangentially (see Fig. 2) into the bottom of the closed tank so that the waste liquid follows a spiraling and ascending path in the tank to the liquid outlet.

The liquid outlet of the closed tank is connected to an influent conduit 21 which is centrally connected into the bottom of a relative shallow, large diameter tank 22 having a concrete bottom 23 which slopes inwardly and downwardly, and an upright steel side wall 24. An annular baffle 25, coaxially disposed within the tank, is spaced from the tank side wall and bottom, and supported by brackets 26 attached to the interior of the tank side wall. The baffle extends from a point near the tank bottom to above the normal liquid level for the tank.

The top of the tank wall is provided with a notched weir 27 over which clarified waste flows from the annular space between the baffle and the tank wall into a peripheral launder 28. The overflow is withdrawn through an outlet pipe 29. A conventional superstructure 30 is mounted across the top of the tank and supports a walkway 31 and handrail 32. The superstructure also supports a conventional drive unit 33 centrally located above the tank. The drive unit furnishes power to rotate a central column 34 vertically disposed in the center of the tank and journalled at its lower end into the influent conduit on a bearing 35.

Influent ports 36 are provided in an intermediate part of the central column. An inner lower horizontal flange 37 extends into the central column (see Fig. 4) to form an annular seat within the column directly below the ports. An outer lower horizontal flange 38 is disposed around the outside of the column directly below the ports. An upper horizontal flange 39 is provided on the central column directly above the ports and extends outwardly to cooperate with the outer lower flange to form a diffuser nozzle 40. A central column back pressure valve 41 is disposed above the seat and is attached to the lower end of a valve shaft 42 which extends up through an annular guide member 43 disposed within the central column. An upper portion 44 of the valve shaft is threadably engaged in a closure 45 disposed in the upper end of the central column. A valve adjusting wheel 46 is attached to the upper end of the valve shaft for controlling the position of the valve with respect to the seat.

Four radially extending, equally-spaced rake arms 47 are attached at their respective inner ends to the lower end of central column and are supported by guy wires 48 attached to the arms and the central column. Downwardly extending scraper blades 49 are attached to each of the arms and are adapted to rake settled solids along the tank bottom into a centrally located sludge pocket 50 as the column is rotated. Settled solids are removed from the sludge pocket by means of a sludge discharge pipe 51.

A scum trough 52, with its top just above the liquid level in the tank, extends radially inwardly from a portion of the baffle. The bottom of the scum trough slopes downwardly toward the baffle and terminates in a chute 53 which extends through the baffle and tank walls. Scum is removed from the trough to scum disposal through the chute.

The central column carries four radial skimming arms 54 which extend horizontally above the level of the pool in the tank. The skimming arms are braced by support members 55 attached to the central column. A skimming blade 56 is hinged at the outer end of each radial arm and is adapted to swing in a vertical plane. As shown in Fig. 3, the shaft rotates clockwise and carries the four skimming blades over the pool surface to a first ramp 57 near the scum trough. A first portion 58 of the ramp slopes upward sharply, a second portion of the ramp 59 having a more gentle slope to a level above that of the liquid in the pool. The upper edge of the second ramp portion terminates at the scum trough. Horizontal bars 60 extend across the top of the trough and prevent the skimming blades from dropping into the scum trough. After passing over the scum trough, the skimming blades descend a second ramp 61 until their bottom portions are again below the liquid level in the pool.

An annular ring 62 is disposed about the central column above the liquid level. The ring is provided with perforations 63 so that water from a water supply line 64 is sprayed radially over the liquid surface toward the baffle. The water spray moves the floating hydrocarbons, which may be in the form of foam, into the path of the skimming blades.

The operation of the method is as follows: The pump supplies influent hydrocarbon-containing waste under pressure to the liquid inlet of the closed tank. The compressor supplies gas, e. g., air to charge the pressurized waste with dissolved gas. The charged waste then passes through the liquid inlet back-pressure valve and into the closed tank where its pressure is reduced sufficiently to allow some of the dissolved gas to come out of solution.

The respective settings of the vapor outlet back-pressure valve and the central column back-pressure valve control the pressure maintained on the solution in the closed tank. The liquid influent enters the closed tank near its bottom and tangentially to the upright wall at the point of entry. This imparts a swirling motion to the liquid as it rises in the tank and passes out the liquid outlet. During the retention time in the closed tank the evolved air rises to the top of the closed tank, carrying with it the more volatile constituents of the hydrocarbons. The gas and volatile hydrocarbons pass from the closed tank through the vapor outlet and the vapor outlet backpressure valve, and are then passed through the condenser where the condensable constituents are condensed and collected. The non-condensables are either exhausted to the atmosphere; or, if objectionable, are burned, absorbed, or treated chemically.

The waste from which the more volatile hydrocarbons have been removed, passes through the liquid outlet of the closed tank and to the influent of the open tank. On passing through the back-pressure valve in the central column the waste liquid undergoes a further pressure drop and additional gas is freed from solution. This air is in the form of fine bubbles which attach to the individual liquid and solid particles of the remaining hydrocarbons remaining in the waste liquid and facilitate the rapid flotation of the hydrocarbons to the surface of the pool confined within the baffle. The hydrocarbons floating to the surface of the pool within the baffle are then skimmed into the scum trough by the rotary action of the skimmers. These floating hydrocarbons are of such low volatility that they are ineffective as air pollutants. The water spray serves to force the hydrocarbons out into the path of the skimmers where it is more readily scraped into the scum trough. Any hydrocarbons or other materials which are heavier than the aqueous waste settle to the bottom of the tank and are raked into the sludge pocket and then carried to sludge disposal. The dimensions of the inner and outer compartments are sufficiently large so that the liquid within the tank is in a substantially quiescent state. This promotes a more complete separation of the floatable and settlable hydrocarbons from the aqueous waste. The clarified waste liquid passes under the baffle into the outer compartment and over the weir into the launder, where it is carried by the overflow pipe to discharge or further use as required.

In treating waste liquids which have no settlable materials in them, the above described apparatus can be modified to the extent of eliminating the rakes and the sludge pocket.

The amount of dissolved air carried by the influent waste liquid into the open tank can be controlled by the position of the central column back-pressure valve. If the nature of the waste is such that a relatively small amount of dissolved air need be carried into the open tank then the valve can be opened wide. If the waste is such that it is desirable to have a relatively large quantity of dissolved gas carried into the opened tank, then the valve is closed down as required.

Thus the invention provides means for continuously separating hydrocarbons from an aqueous waste without any need for intercepting the process for periodic cleaning of equipment due to settled solids. In addition the separation is more rapid than is possible with conventional methods, and pollution of the atmosphere with volatile hydrocarbons is greatly reduced.

I claim:

1. In the treatment of an aqueous liquid waste containing both gaseous and non-gaseous hydrocarbons, the improvement which comprises charging said waste with another gas at superatmospheric pressure, passing the charged waste through an agitated body thereof maintained in a closed chamber at a lower but still superatmospheric pressure so that some of the charging gas comes out of solution in the waste and carries with it evolved gaseous hydrocarbons, removing the gas that comes out of solution together with the evolved hydrocarbons from the chamber as a mixture, treating the mixture to eliminate therefrom at least part of the evolved gaseous hydrocarbons, removing the waste from which the gaseous hydrocarbons have been evolved at superatmospheric pressure from the chamber and introducing it into a relatively quiescent pool of waste maintained in an open chamber at atmospheric pressure so that more of the charging gas comes out of solution in the waste and buoys up non-gaseous hydrocarbons to form a scum at the surface of the pool, and removing the hydrocarbon scum from the pool.

2. In the treatment of an aqueous liquid waste containing gaseous hydrocarbons and two classes of non-gaseous hydrocarbons, one of which tends to float in the waste and the other to settle, the improvement which comprises charging said waste with another gas to put the gas in solution in the waste at superatmospheric pressure, passing the charged waste through an agitated body thereof maintained in a closed chamber maintained at a pressure that is superatmospheric but less than that at which the waste is charged so that some of the charging gas comes out of solution in the waste and carries with it evolved gaseous hydrocarbons, removing the resulting gaseous mixture from the closed chamber, treating the removed gaseous mixture to eliminate at least part of the gaseous hydrocarbons therefrom, removing the waste from which the gaseous hydrocarbons have been evolved from the closed chamber at superatmospheric pressure and introducing it into a relatively quiescent pool of waste maintained in a chamber open to the atmosphere so that more of the charging gas comes out of solution in the waste and buoys up non-gaseous hydrocarbons that tend to float to the top of the pool, while the heavier non-gaseous hydrocarbons sink to the bottom of the pool, skimming the floated hydrocarbons from the top of the pool and removing the sunken hydrocarbons from the bottom of the pool.

3. In the treatment of an aqueous liquid waste containing gaseous and non-gaseous hydrocarbons, the improvement which comprises charging said waste with another gas at superatmospheric pressure so that the waste becomes supersaturated with said other gas in a dissolved state, passing the charged waste through a closed chamber maintained at a pressure below that of the charging but still superatmospheric so that some of the charging gas comes out of solution and carries with it evolved gaseous hydrocarbons, removing the resulting mixture of charging gas and evolved gaseous hydrocarbons from the closed chamber, treating the removed mixture to eliminate at least part of the gaseous hydrocarbons, removing the waste from which said charging gas has been partially removed from the chamber, introducing the removed waste to a relatively quiescent pool of waste retained in an open chamber at atmospheric pressure, so that more of the charging gas comes out of solution as fine bubbles and buoys up non-gaseous hydrocarbons to form a scum on the pool, and removing said scum from the pool.

References Cited in the file of this patent

UNITED STATES PATENTS

| | | |
|---|---|---|
| 1,102,152 | Jones | June 30, 1914 |
| 1,462,748 | Jones | July 24, 1923 |
| 2,136,774 | Hickman | Nov. 15, 1938 |
| 2,171,203 | Urbain et al. | Aug. 29, 1939 |
| 2,220,574 | Little | Nov. 5, 1940 |
| 2,232,294 | Urbain et al. | Feb. 18, 1941 |
| 2,248,177 | Karlstrom | July 8, 1941 |
| 2,360,551 | Durdin | Oct. 17, 1944 |
| 2,440,514 | Karlstrom | Apr. 27, 1948 |
| 2,679,477 | Kivari et al. | May 25, 1954 |

OTHER REFERENCES

API Manual on Disposal of Refinery Wastes, vol. I, 5th ed., 1953, pp. 42 and 49.

D'Arcy: Dissolved Air Flotation, 50, Oil and Gas Journal, No. 27, November 8, 1951, pp. 319–322.

Imhoff et al.: Sewage Treatment, New York: Wiley, 1940, pp. 52–55.